Dec. 10, 1935.   C. G. BUTLER   2,024,126
GREASE GUN
Filed Nov. 23, 1933   2 Sheets-Sheet 1
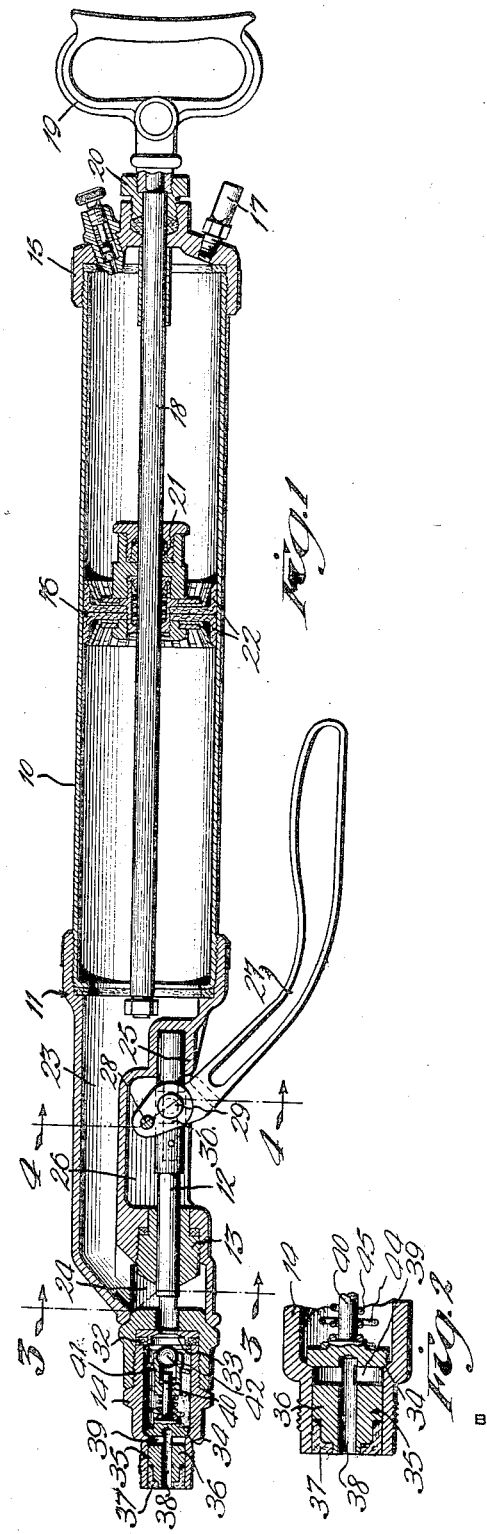
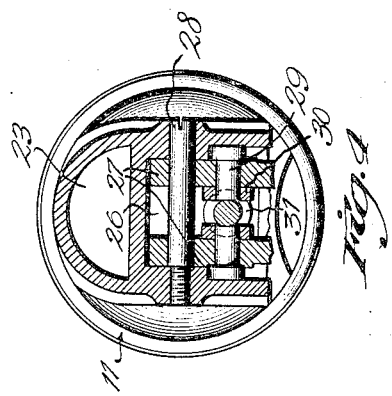
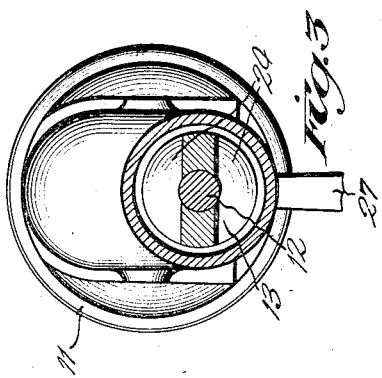
INVENTOR
Clyde G. Butler
BY
Wood & Wood
ATTORNEYS

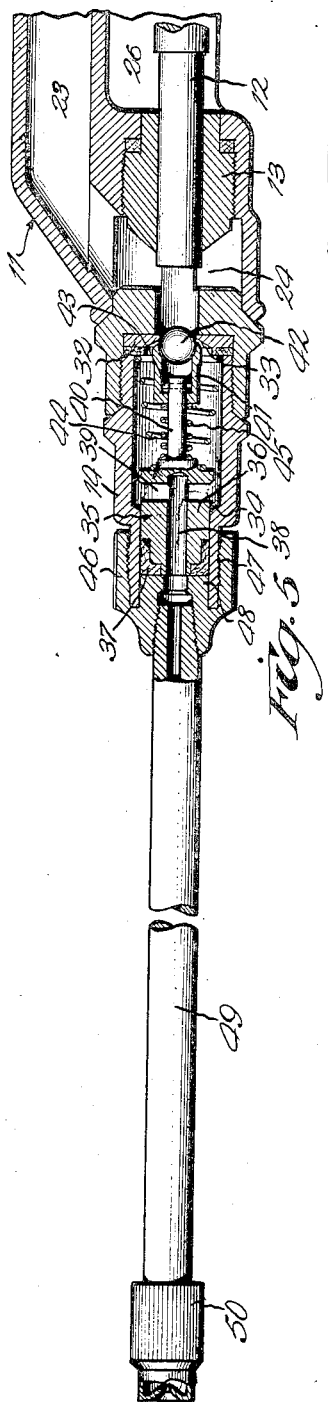
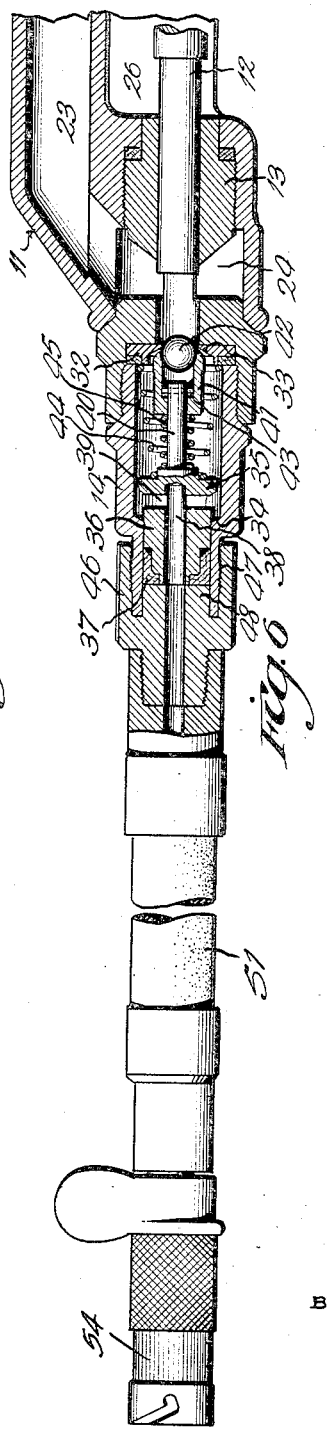
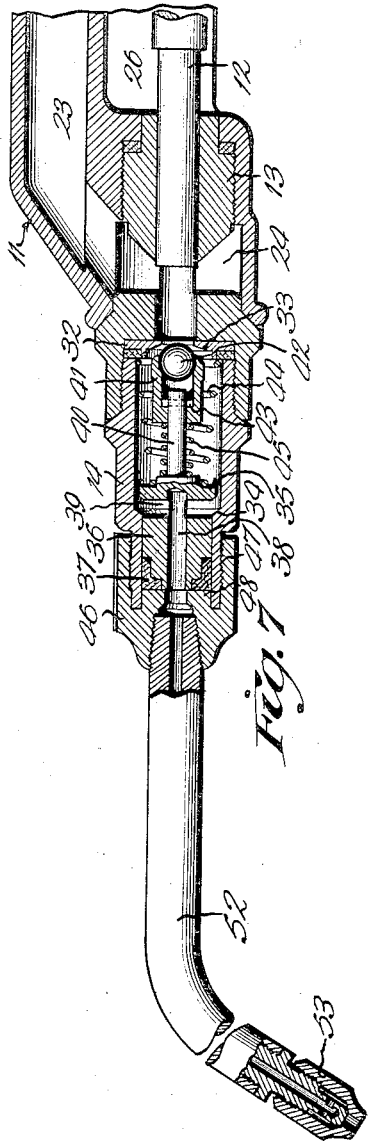

Patented Dec. 10, 1935

2,024,126

UNITED STATES PATENT OFFICE 2,024,126

GREASE GUN

Clyde G. Butler, Cincinnati, Ohio, assignor to The Cincinnati Ball Crank Company, Cincinnati, Ohio, a corporation of Ohio Application November 23, 1933, Serial No. 699,417

16 Claims. (Cl. 221—47.4)

This invention relates to the art of lubrication and is particularly directed to improvements in lubricating apparatus of the character known as hand guns. These grease guns are relatively small and portable for convenience in applying them to the points or fittings to be lubricated. Some means is provided for moving the grease to the forward end of the gun or the discharge head thereof. The head includes a nozzle and a grease ejecting piston with actuating means therefor. For the purpose of illustrating the present improvements they are disclosed in relation to the type of gun described and claimed in the application of Clyde G. Butler, filed February 20, 1933, Serial No. 657,563.

In the mentioned application the gun includes the grease ejecting piston movable in a cylinder in which the grease intake opening is arranged for passage of grease into the cylinder bore when the piston is retracted. The structure includes a check valve located in the discharge nozzle permitting ejection of grease but closing upon the retractive stroke of the piston.

In the field of lubrication by means of hand guns, there are two general classes of grease service to be rendered. The first includes the application of grease to fittings of which there are several types. One type is known as the butt type to which grease is supplied merely by placing the nozzle thereagainst and holding the gun in position by a physical force applied on the gun. Another type is known as the pin type which may include any type of coupling means, whereby the discharge tube is fixed in place on the fitting and need not be pressed thereagainst by the operator to maintain a loading seal. In the first instance the discharge tube is rigid or of lance type and in the second a flexible or rubber tubing may be used.

The second class of service is that wherein the gun is used for the insertion of grease into transmission casings etc., wherein for example an oil nozzle tube may be used, insertable into the plug hole of a transmission casing. These two classes of service require the application of the grease under different pressures as high pressure in the first class and low pressure in the second class.

The purpose of this invention is to provide for the adaptability of hand guns to these different classes of servicing problems. Accordingly, it is the object of this invention to provide an improved nozzle for this type of gun including a valve, which is controlled by particular types of service connections attached to the nozzle. That is to say, it has been provided in the present case that the operator may by attachment of a rigid lance, oil nozzle, or flexible tube, automatically condition the gun for different classes of services having different pressure and volume requirements.

In this adaptation of the gun to certain uses, it is arranged that the dispensing connections used with the fittings such as the butt type and the pin type will operate the valve in the nozzle to maintain it normally in closed position where it will open only to the discharge operations of the grease ejecting piston. In other types of service such as supplying grease to a grease compartment, it is arranged that the discharge connection will operate the valve for placing it in normally open position so that upon retraction of the piston the grease can flow freely through the nozzle.

It is a further object of this invention to provide an improved nozzle for a grease gun which is automatically closed when the discharge tubes are disconnected therefrom, so that it is impossible for the operator to cause grease loss by detaching the discharge tubes without regard to the position of the discharge mechanism.

Other objects and further advantages will be more fully apparent from a description of the accompanying drawings, in which:

Figure 1 is a longitudinal sectional view of a grease gun illustrating the present improvements embodied therein.

Figure 2 is a fragmentary enlarged sectional view taken from Figure 1 for detailing the nozzle valve structure.

Figure 3 is a sectional view taken on line 3—3, Figure 1, illustrating the operating connection to the discharge piston.

Figure 4 is a sectional view taken on line 4—4, Figure 1, illustrating the intake ports to the cylinder.

Figure 5 is a sectional view of the forward or nozzle end of the gun showing a rigid tube or lance attached thereto for supplying the grease to the butt type fitting.

Figure 6 is a view taken similar to Figure 5, illustrating a flexible tube connected to the nozzle for the application of the grease to a pin type fitting.

Figure 7 is a view taken similar to Figure 5, illustrating an oil or grease flow tube attached to the nozzle for free flow of grease from the gun into a grease compartment.

Referring to the drawing, the gun structure to which the present improvements are applied incorporates the following structure. A barrel or cylinder 10 forms the body of the gun. A forward head 11 is screwed on the barrel including the grease ejecting piston 12 and cylinder 13 and mounting the discharge nozzle or fitting 14. A rear closure head 15 is provided. A follower plate or piston 16 is mounted in the cylinder and may be moved forwardly by means of air pressure introduced through a valve 17 in the rear closure head. A piston retracting rod 18 is mounted axially through the barrel being supported in the follower plate at its forward end and in the rear closure plate at its rear end. A stock 19 is fixed on the rear outwardly extended end of the rod for manipulation of the rod and gun and application of pressure longitudinally of the gun for holding the gun on the fitting as in the case of a butt type fitting.

The piston rod is headed at its inner end for engaging and retracting the piston which it traverses. The stock is screwed into the cylinder closure for convenient detachment where it is desirable to retract the piston as in loading operations.

The sliding engagement of the rod 18 through the rear closure cap is sealed by means of a packing gland 20 screwed into the cap. The follower plate is slidable on the rod and for this reason incorporates suitable packing 21 to prevent grease flow along the rod into the air chamber. Reversely facing cup gaskets 22 are incorporated in the follower plate or piston for engaging the lylinder or barrel wall. The follower plate is fabricated for assembling these parts in a previously disclosed manner which it is not deemed necessary to describe here.

The forward or discharge head 11 has a passageway 23 therein extended forwardly from the supply barrel. This passageway is alongside of the piston 12 and extends laterally at its forward end communicating with the bore of the cylinder 13 through radial apertures 24 of the cylinder.

The piston has its forward portion disposed in the cylinder element 13 screwed into the forward end of the gun and has its rear end slidably supported in a lug 25 of the forward casing. The intermediate portion of the piston is exteriorly disposed across a depressed or recessed portion 26 of the forward cap or closure. An operating lever 27 is pivoted on a cross pin 28 traversing this recess between the bottom of the recess and the piston. The lever 27 is projected laterally and is curved rearwardly. The lever is flexibly connected to the piston by means of pivot pins 29 carrying pivot blocks 30 engaged in opposite sides of an annular groove 31 in the piston, the lever straddling the piston for this purpose. The general swing or range of operative movement of the lever in the ejecting stroke is forward or lengthwise of the gun structure. When in retracted position, the lever lies fairly close to the body of the gun.

As stated, the cylinder element has radial ports entering its bore just in front of the piston when the piston is in retracted position. The nozzle or discharge fitting 14 of the gun consists of a cylindrical element screwed into a screw-threaded enlarged bore portion in the forward end of the cylinder against a packing washer 32 lying against the shoulder between the respective bore portions of the cylinder, this washer being bored and counterbored to provide an outwardly facing valve seat 33. Another valve seat 34, opposing the seat 33, is provided by a shoulder between a reduced bore portion of the fitting and the valve chamber bore thereof.

A fabricated double valve unit 35 is incorporated in the nozzle element. One valve element of this valve unit comprises a cylindrical headed slidably mounted part 36. The headed or inner end of this part lies against the seat 34 formed by bore reduction in the nozzle. The outer end of the element is slidably mounted in the reduced bore portion and carries a cup shaped packing 37 in a counterturned annular recess in its outer face, the flange of the packing lying against the bore of the nozzle. This part 14 is closed at its inner end and has a bore or passageway 38 projected outwardly through radial slots 39 adjacent the valve head thereof.

A stud 40 is extended axially from the inner end of this element, this stud slidably supporting a ball valve carrying sleeve 41, the ball valve 42 being secured in the inner end of the sleeve by swaging the end of the sleeve about the ball. The stud includes a diametrically fixed cross pin 43 extended into an enlarged counterbored portion at the inner end of the sleeve so that inward displacement of the sleeve from the stud is prohibited. This ball valve is supported adjacent the seat 33 in the washer previously described, or in other words, controls the initial exit of the grease.

Two springs are employed, one 44 of which is under compression between the head of the first mentioned valve part 36 and the valve seat washer 32 for urging the entire valve unit outwardly and seating the first mentioned valve element 36; and the other 45 of which is disposed under compression between the inner end of the first mentioned valve element 36 about the stud and against the ball carrying sleeve 41.

As disclosed in Figures 5 to 7 inclusive, three types of discharge fittings or connections may be used in connection with this nozzle. Any of these discharge connections used incorporates a coupling 46 on its inner end having a screw-threaded bore portion 47 adapted to be screwed on the outer end of the nozzle and includes a circular axially disposed lug portion 48 projected from the base of the bore portion. The circular lugs are of a diameter snugly fitting into the bore of the nozzle and engaging against the valve unit. These circular lugs are of different heights, depending upon the position of the valve unit desired for the particular connection or service. The utility of the valve unit in the automatic change-over for control of the grease gun will be apparent from the following description of the effect and function of these various discharge connections.

In Figure 5 the rigid lance type of discharge connection is formed of a piece of tubing 49 carrying the above described coupling 46 at its inner end and a butt element 50 at its outer end for contact with the butt type fitting. In the case of this type of discharge connection, the lug 48 is of relatively considerable height, and is effective when the coupling is attached for slidably moving the valve unit for completely unseating the outer valve element 36 and seating the inner valve element 42 slightly compressing the inner valve control spring 45 so that a spring urged valve contact is accomplished. Accordingly, the valve 42 becomes a check valve and the grease discharge piston will unseat the valve on its discharge strokes and the valve will seat on the retraction strokes.

In the instance of Figure 6, a flexible hose connection 51 is shown carrying a coupling 54 in its outer end for attachment to the pin type fitting.

The lug 48 is of the same height as that described in the preceding view so that the same control of the valve unit is provided.

Figure 7 illustrates the alternate position of the valve unit for what is known as free flow. In this case the discharge connection is in the form of a curved tube 52 having a valve 53 at its outer end adapted for use in filling grease compartments. The lug 48 is of less height than the lug in the preceding two forms and accordingly the valve unit is moved a less distance by coupling. Both valves of the unit remain unseated so that the valve unit is entirely ineffective when this type of connection is being used and the grease will flow through under low pressure when the piston 12 is retracted beyond the inlet ports 24.

It will be noted from the detailed view Figure 2 that the valve unit is normally urged outwardly by means of spring 44 for seating the outer valve element when no connection is being used. Therefore, there is no opportunity for grease loss when a connection is not in place or when the connections are being unscrewed.

Having described my invention, I claim:

1. In a grease discharge device, a discharge nozzle having opposing valve seats therein, a compound valve disposed between said seats, said compound valve constituting valve elements unitarily mounted and relatively movable, the maximum spacing of said valve elements being less than the distance between said seats, and spring means for normally urging said valve unit against the outer of said valve seats.

2. In a grease gun, a grease discharge means, including a piston, a nozzle for said means including opposing seats, a valve device movable between said seats, including spaced valve elements cooperating with the respective valve seats, yieldable means normally spacing said valve elements, and yieldable means for urging said valve device outwardly seating the outer valve element thereof and unseating the inner valve element thereof.

3. In a grease gun, a grease discharge head including a passageway; a piston in said passageway, a valve unit in front of said piston, a grease inlet to said passageway between the valve unit and said piston when the piston is retracted, said passageway including opposing seats and said valve unit including valves spaced apart a distance less than the distance between said seats, and yieldable means normally spreading said valves apart and alternately engageable with said seats or between said seats and the inner valve acting as a check valve when engaged on the inner seat.

4. In a grease gun discharge means including a high pressure discharge cylinder having an outlet passageway and a piston in said cylinder, a discharge nozzle having opposing valve seats and communicating with said outlet passageway, a compound valve mounted in said nozzle and including yieldably spaced valve elements alternately cooperating with said opposing seats, means for limiting the spacing of said valve elements to a maximum distance less than the spacing of said opposing valve seats, and a discharge connection, said nozzle including means for receiving said discharge connection, said connection operating said compound valve for moving said valve relative to said seats for controlling the grease discharge.

5. In a grease gun, a low pressure grease feeding means, a high pressure grease discharge means, a discharge fitting having a passageway in communication with said grease feeding and discharge means, said fitting including opposing seats, a spring pressed valve element slidably mounted in said fitting and normally engageable with the outer of said seats, a second spring pressed valve element slidably mounted on the first valve element and normally urged away from said first valve element and cooperative with the inner of said valve seats, said valve elements alternately seated, a discharge connector for actuating said valve elements by contact with the first element, and means on the discharge fitting for attaching said discharge connection thereto.

6. In a grease discharge device, a discharge nozzle having opposing valve seats therein, low pressure grease forcing means urging the grease through said nozzle, high pressure grease forcing means for urging the grease through said nozzle, a compound valve disposed between said valve seats, said compound valve including coaxially movable valve elements, spring means for spreading said valve elements, spring means for urging the compound valve toward the outer seat, a discharge conduit, and means on said conduit for attaching said nozzle thereto, said conduit having a device therein for moving the compound valve relative to said seats.

7. In a grease discharge device, a discharge nozzle having opposing valve seats therein, a valve unit disposed between said seats, said valve unit incorporating yieldably spaced valve elements respectively cooperating with said seats, the maximum spacing of said valve elements being less than the distance between said seats, spring means for normally urging said valve unit against the outer of said valve seats, and a discharge tube attachable to said nozzle and including a device for controlling the position of said valve units relative to said seats.

8. In a grease gun discharge means including a high pressure discharge cylinder having a single outlet passageway, a piston in said cylinder and low pressure means for forcing grease to said cylinder; a discharge nozzle communicating with the single outlet passageway, a compound valve device in said nozzle closing to discharge pressures in one position and acting as a check valve in an alternate position, and a discharge connection, said nozzle including means for receiving said discharge connection, said connection operating said valve device and controlling the grease discharge.

9. In a grease gun, a grease discharge means, a discharge fitting having a single passageway in communication with said grease discharge means, said fitting including opposing seats, a spring pressed valve element slidably mounted in said fitting and normally engageable with the outer of said seats, a second spring pressed valve element slidably mounted on the first valve element and normally urged away from said first valve element and cooperative with the inner valve seat, said valve elements spaced apart a distance less than the distance between the seats, a discharge connector including an axial extension for actuating said valve elements by contact with the first element, and means on the fitting for attaching said discharge connection.

10. In a grease gun, a grease discharge means including a cylinder and a piston therein, a discharge nozzle for said grease discharge means including opposing seats, a valve unit movable between said seats, said valve unit including spaced valve elements cooperating with the respective valve seats, a spring for normally spreading said valves, means for limiting the spreading movement of said valves, whereby the maximum distance between the valves is less than the distance between said seats, and spring means for urging said valve unit outwardly for seating the outer valve element thereof, said valve unit being effective for sealing the discharge nozzle against leakage and unseated upon insertion of a coupling.

11. In a grease gun, a grease discharge means including a piston, a nozzle for said means including opposing seats, a valve device movable between said seats including spaced valve elements cooperating with the respective valve seats, yieldable means normally spacing said valve elements, yieldable means for urging said valve device outwardly for seating the outer valve element thereof, and unseating the inner valve element thereof, and means for interchangeably attaching discharge tubes to said nozzle, each of said discharge tubes effective for operating said valve device, one thereof unseating the outer valve element and seating the inner valve element thereof, and the other effective for positioning said valve device intermediate of said seats.

12. In a grease gun, a low pressure grease supply means, a high pressure cylinder in communication with said supply means, a piston in said cylinder, means for operating the piston, a discharge head for said cylinder including a valve seat, a yieldably mounted valve disposed in said discharge head normally spaced from said seat, a conduit including means for engaging said valve on the seat whereby it opens against spring pressure to permit high pressure grease discharge, and means for detachably mounting said conduit on said head.

13. In a grease gun, a low pressure grease supply means, a high pressure cylinder in communication with said supply means, a piston in said cylinder, means for operating the piston and retracting it to a point where the grease can flow from the supply means into the cylinder, a discharge head for said cylinder including a valve seat, a spring urged valve normally in contact with said seat, a conduit including a valve on its outer end and having a portion for unseating said valve, and means for detachably mounting said conduit on said head, whereby grease can flow through said head into said conduit under low pressure from said supply means when said piston is retracted.

14. In a grease gun of the character disclosed, a grease supply means including a low pressure grease forcing device therein, a discharge head therefor having a nozzle, said discharge head having a discharge passageway connecting said nozzle and said grease supply means, said passageway including a valve seat, a valve cooperating with said seat, said nozzle including a seat, a valve cooperating with said latter seat, said valves mounted for unitary movement and spring urged apart, spring means normally maintaining said latter valve in said nozzle on its seat, a nozzle extension effective for unseating the last mentioned valve and seating the valve in the discharge passageway, and means for detachably securing said nozzle extension to the nozzle.

15. In a grease gun of the character disclosed, a grease supply means including a low pressure grease forcing device therein, a discharge head therefor having a nozzle, a discharge passageway connecting said nozzle and said grease supply means, said nozzle and passageway respectively including valve seats, said seats facing each other, a valve for each seat, said valves mounted for unitary movement and spring urged apart, a nozzle extension including a projection effective for unseating the nozzle valve and ineffective for seating the valve in the passageway, said nozzle extension including a valve on its outer end, and means for attaching said nozzle extension in position on said nozzle, whereby free flow of grease through the passageway, nozzle, and extension can occur when the nozzle extension is in position and the valve therein in open position.

16. In a grease discharge means, a high pressure discharge cylinder having a single outlet passageway therethrough, a piston in said cylinder, low pressure means for forcing grease into said cylinder, said piston retractable to a position permitting flow of grease into the cylinder from the low pressure means, a discharge nozzle communicating with the single outlet passageway, a compound valve device in said nozzle closed to discharge pressure in one position and acting as a check valve in an alternate position, a discharge conduit, and means for attaching said conduit to said nozzle, said conduit including means for operating said valve device for controlling its position.

CLYDE G. BUTLER.